(12) United States Patent
Dietrich et al.

(10) Patent No.: US 6,453,775 B1
(45) Date of Patent: Sep. 24, 2002

(54) TOOL FOR INSTALLING ANIMAL GUARDS ON OVERHEAD ELECTRICAL INSULATORS

(76) Inventors: Darcy A. Dietrich, 609 NW. 80 Ter., Kansas City, MO (US) 64118; Shawn A. Dietrich, 7224 Maple, Overland Park, KS (US) 66204

( * ) Notice: Subject to any disclaimer, the term of this patent is extended or adjusted under 35 U.S.C. 154(b) by 97 days.

(21) Appl. No.: 09/629,712

(22) Filed: Jul. 31, 2000

(51) Int. Cl.[7] ............................................. B25B 23/16
(52) U.S. Cl. ........................ 81/53.1; 294/19.1; 29/278
(58) Field of Search ..................... 29/225, 229, 243.56, 29/278, 450; 81/53.1; 294/19.1; 174/5 R

(56) References Cited

U.S. PATENT DOCUMENTS

| | | | |
|---|---|---|---|
| 1,667,332 A | * | 4/1928 | Stahler |
| 1,752,575 A | * | 4/1930 | Roselle |
| 2,796,661 A | * | 6/1957 | Tuttle |
| 2,829,548 A | * | 4/1958 | Byrd |
| 3,327,376 A | * | 6/1967 | Freeman et al. |
| 3,763,872 A | * | 10/1973 | Gooley |
| 3,913,205 A | * | 10/1975 | La Bate |
| 5,065,037 A | * | 11/1991 | Bailey |
| 5,224,745 A | * | 7/1993 | Howell |
| 5,247,725 A | * | 9/1993 | Vaughn, Jr. |
| 5,564,852 A | * | 10/1996 | Maxwell et al. |
| 5,593,196 A | * | 1/1997 | Baum et al. |
| 5,603,543 A | * | 2/1997 | Ratte |
| 5,650,594 A | * | 7/1997 | Urnovitz |
| 5,794,495 A | * | 8/1998 | Anderson |
| 5,967,575 A | * | 10/1999 | Blake |

OTHER PUBLICATIONS

3M Electrostatic Animal Guard Instruction Sheet, dated Jun. 10, 1998.

* cited by examiner

*Primary Examiner*—David P. Bryant
(74) *Attorney, Agent, or Firm*—Shook, Hardy & Bacon L.L.P.

(57) ABSTRACT

A tool for installing an electrostatic animal guard on an overhead electrical insulator using an elongate extension hot stick pole from ground level. The tool includes a base plate and a flap connected to the plate in a manner allowing the flap to flex away from the plate so that the base of the animal guard can be frictionally gripped between the plate and flap. A contoured cavity in the face of the plate receives the base of the guard to enhance the gripping action of the tool. The tool is mounted on the elongated pole, the animal guard is received and gripped by the tool and is installed on the insulator using the pole from ground level, and the pole is pulled to overcome the frictional gripping force and release the tool from the guard.

4 Claims, 2 Drawing Sheets ated by numeral 10 generally designates a
TOOL FOR INSTALLING ANIMAL GUARDS ON OVERHEAD ELECTRICAL INSULATORS

FIELD OF THE INVENTION

This invention relates generally to animal guards that are mounted on power line insulators to prevent animals from creating short circuits and other electrical problems. More particularly, the invention is directed to a tool which facilitates safe installation of animal guards and to a method of installing animal guards from a safe position on the ground.

BACKGROUND OF THE INVENTION

Squirrels and other climbing animals have long presented problems relating to overhead power lines. Animals can climb power poles or lines and create short circuits that can destroy or otherwise damage transformers and other electrical equipment.

Recognizing this problem, various types of guards have been proposed to prevent animals from contacting two different power lines and thus creating a short circuit. One type of guard that is prevalent is an electrostatic animal guard that takes the form of a split ring having a bent wire base opposite the split. Radially extending wires project from the ring and are bent on their outer ends to provide a physical barrier to the animals. A small spring applied to the base area of the guard urges the ring closed at the split. The electrostatic animal guard is applied to an insulator bushing by pushing the split onto one of the neck areas of the insulator. The split construction of the ring allows it to open in order to slip onto the insulator, while the spring then assures that the split closes up to retain the animal guard in place.

Although this type of animal guard has functioned in a satisfactory manner for the most part, safety problems have been encountered during the installation procedure. Typically, the animal guard is installed on the insulator using a "hot stick" which is a hand held pole approximately eight feet long. The hot stick carries jaws on its end which are used to grip the projecting base of the animal guard. The installer must climb partially up the utility pole or work from a lift or ladder as he manipulates the hot stick to slip the animal guard onto the insulator bushing and thereafter release the jaws.

The main problem with this procedure is that the installer must work from an elevated position on a utility pole or ladder or in a lift in relatively close proximity to the transformer. If the transformer is accidentally shorted, the short circuit can create an electrical spark or arc or even a fire dangerously close to the installer. Serious injury can result, as well as damage to the electrical equipment. This problem is compounded by the difficulty involved in using a hot stick with jaws to install the animal guard.

SUMMARY OF THE INVENTION

The present invention is directed to a tool that can be used safely and easily to install an electrostatic animal guard on an overhead electrical insulator. In particular, it is an object of the invention to provide a tool that allows a worker at ground level to install the animal guard. This is especially important from a safety standpoint because the worker is on the ground 20 or 30 feet away from the transformer at a safe distance in the event that there is an accident creating an electrical arc or fire.

Another important object of the invention is to provide an installation tool that allows the animal guard to be installed easily compared to the installation techniques that have been used in the past. In this regard, the tool is specially constructed to firmly grip the base of the animal guard between a main plate and a flap that is urged toward the main plate to frictionally hold the base while the guard is being installed. At the same time, the tool can be easily released with a simple pull after the guard is in place on the insulator bushing.

Still another important feature of the tool of the present invention is the provision of a contoured cavity in the face of the main plate that receives the irregular bent wire base of the animal guard. The cavity has a contoured shape in conformity with the base of the animal guard to ensure that the guard will not slip or become prematurely dislodged from the tool during installation. Accordingly, it facilitates the installation of the animal guard and prevents accidents that can create short circuits and other electrical problems.

Other and further objects of the invention, together with the features of novelty appurtenant thereto, will appear in the course of the following description.

DESCRIPTION OF THE DRAWINGS

In the accompanying drawings which form a part of the specification and are to be read in conjunction therewith and in which like reference numerals are used to indicate like parts in the various views.

DETAILED DESCRIPTION OF THE INVENTION

Figure 1:
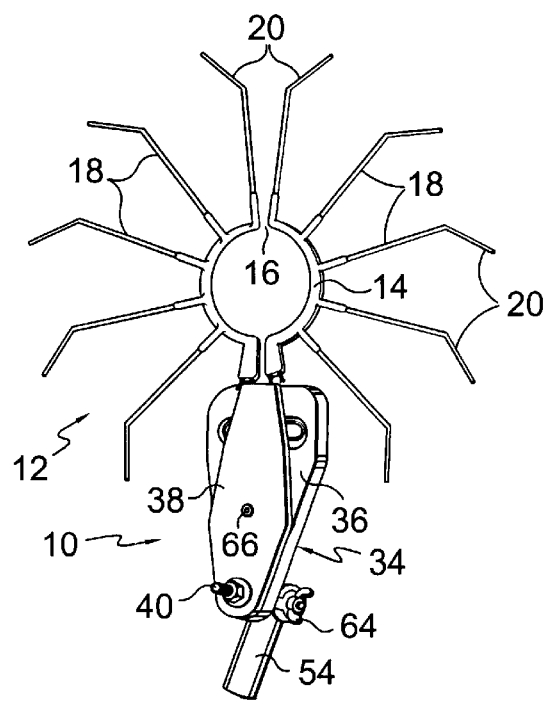
FIG. 1 is a perspective view showing a tool constructed in accordance with a preferred embodiment of the present invention applied to an electrostatic animal guard and mounted on an elongated extension hot stick pole which is shown only fragmentarily.

Referring now to the drawings in more detail and initially to FIG. 1 in particular, numeral 10 generally designates a tool which is constructed in accordance with a preferred embodiment of the present invention and which is used for the installation of an electrostatic animal guard of the type generally designated by numeral 12. The animal guard 12 is a commercially available device which is installed on overhead electrical insulators to prevent squirrels and other climbing animals from damaging electrical equipment. The animal guard 12 has a split ring 14 which is generally circular and has a split 16 located opposite a base portion of the animal guard. Extending radially outwardly from the split ring 14 are a plurality of spaced apart arms 18 each of which takes the form of a wire having a bent outer end portion 20. The arms 18 provide physical barriers to animals when the animal guard 12 is installed.

Figure 6:
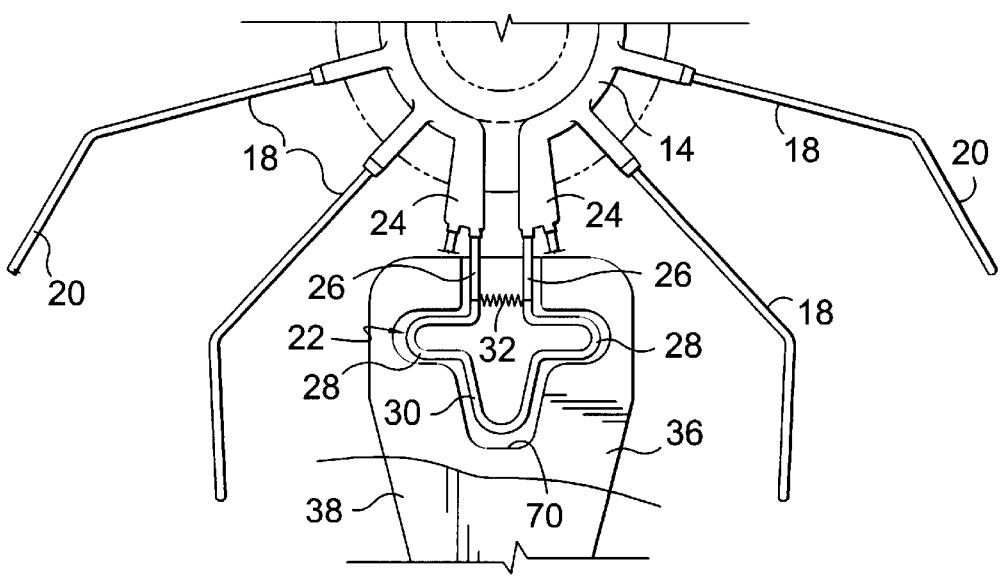
FIG. 6 is a fragmentary sectional view taken generally along line 6—6 of FIG. 4 in the direction of the arrows.

FIG. 6 best illustrates the details of the base 22 of the animal guard. Diametrically opposite to the split 16, the ring 14 has a pair of outwardly projecting stubs 24 which are spaced apart on opposite sides of a second split area of the ring. The base 22 takes the form of a bent wire having parallel legs 26 extending outwardly from the stubs 24 essentially as extensions of them. A pair of looped arms 28 extend outwardly in opposite directions from the ends of the legs 26 and are looped back inwardly where they join a U-shaped tip portion 30 of the base 22. A small tension spring 32 is connected between the two legs 26.

Figure 4:
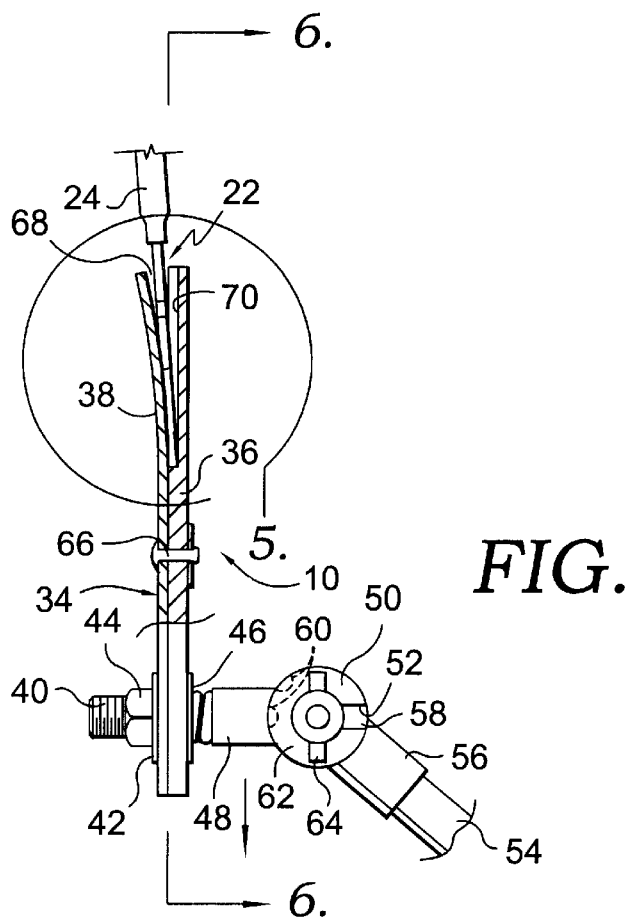
FIG. 4 is a side elevational view, partially in cross-section, showing the tool applied to the base of the animal guard and mounted on the extension pole.

As best shown in FIGS. 2–5, the installation tool 10 has a tool body 34 which includes a main plate 36 and a flap 38 connected to the plate. The plate 36 is somewhat thicker and broader than the flap 38 and is generally tapered from top to bottom. The lower portions of the plate 36 and flap 38 conform to one another in shape and are connected by a bolt 40 which receives a washer 42 and a nut 44 on one end. As shown in FIG. 4, the bolt 40 is provided with a spring washer 46 on the side of plate 36 opposite the nut 44. The head of the bolt 40 is formed by a collar 48 which connects with an enlarged disk 50 having a slot 52.

With continued reference to FIG. 4 in particular, the slotted disk 50 provides an attachment allowing the tool 10 to be mounted on the end of an elongated pole 54 which may be a commercially available pole of the type referred to in the trade as an "extension hot stick" which may be 20–30 feet long (or a different length if desired for the particular application involved). The pole 54 is received in a sleeve 56 which connects with a round disk 58. The disks 50 and 58 have confronting faces that are provided with staggered teeth 60 (shown diagrammatically in broken lines in FIG. 4). The teeth 60 on the confronting faces of the disks interfit with one another, and these faces of the disks may be tightened against one another by a bolt 62 which receives a wing nut 64. The angular orientation of the tool 10 relative to the pole 54 may be adjusted as desired by loosening the wing nut and rotating the disks 50 and 58 relative to one another before again tightening the wing nut 64. The interfit between the teeth 60 on the two disks maintains the tool and pole in the relative angular positions at which they are set.

Figure 5:
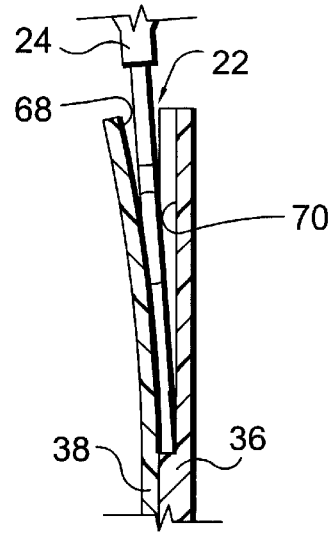
FIG. 5 is an enlarged sectional view showing the detail identified by numeral 5 in FIG. 4.

At a location spaced above the bolt 40, the plate 36 and flap 38 are connected by a suitable fastener such as a rivet 66. The plate 36 and flap 38 are flat and have flat faces adjacent to one another. The portion of the flap 38 that extends above the rivet 66 can be flexed away from the plate 36, as shown in FIGS. 4 and 5. A gap or space 68 is presented between the confronting faces of the plate 36 and flap 38.

The space 68 is partially formed by a contoured cavity 70 which is formed in the surface of plate 36 that faces flap 38. As best shown in FIG. 6, the cavity 70 is contoured in a shape that generally conforms with the shape of the base 22 of the animal guard and is slightly larger than the base in order to accommodate the base when the animal guard is being installed, as will be explained more fully. The upper portion of cavity 70 receives the legs 26. The cavity 70 has two side portions that receive the sidewardly projecting arms 28. The lower portion of the cavity has a shape and size to receive the U-shaped tip portion 30 of the base 22.

In use, the tool 10 is mounted on the end of the extension hot stick pole 54 with the orientation of the tool adjusted to best facilitate installation of the animal guard 12. Normally, the tool is mounted such that the tool body 34 has a generally horizontal orientation when the pole 54 is extended at an angle from the ground at which the installing worker will use it during installation.

The animal guard is received by the tool 10 by inserting the base 22 into the space 68. The ability of the upper portion of the flap 38 to flex away from plate 36 allows insertion of the base 22 into the space 68. At the same time, the flap 38 resists flexure away from plate 36 by spring action and thereby provides a firm grip against the base 22 which holds it in place in the space 68 while the animal guard is being installed.

When the base 22 is inserted into the space 68, the base fits in the cavity 70 and is thus prevented by the cavity walls from moving from side to side or slipping upwardly out of the space 68. The cavity 70 is preferably slightly more shallow than the diameter of the wire which forms the base 22 so that the base 22 projects slightly out of the cavity with the flap 68 slightly flexed in order to provide gripping action against the base as the flap resists being flexed from its normal position.

Figure 7:
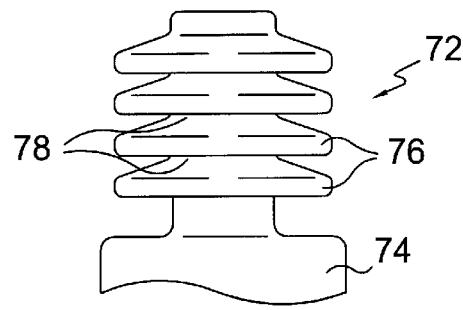
FIG. 7 is an elevational view of an overhead electrical insulator of the type to which the animal guard can be applied by the tool of the present invention.
Figure 3:
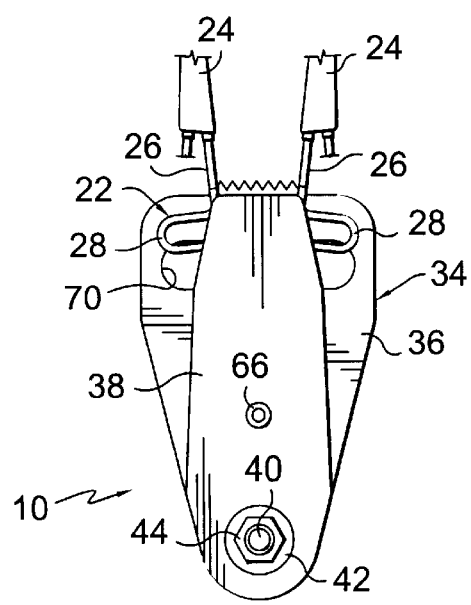
FIG. 3 is a fragmentary front elevational view similar to FIG. 2, but showing the tool partially released from the base of the animal guard.
Figure 2:
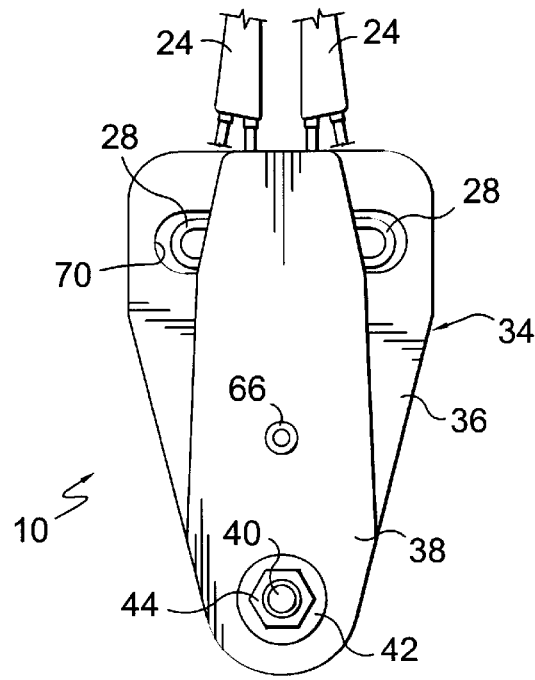
FIG. 2 is a fragmentary front elevational view of the tool on an enlarged scale showing the tool fully applied to the base of the animal guard.

The installation of the animal guard 12 proceeds with the worker standing on the ground and holding one end portion of the pole 54 in order to raise the tool 10 and animal guard 12 to the elevation of an overhead electrical insulator of the type shown in FIG. 7 and generally identified by numeral 72. The insulator 72 may have a base portion 74 and a plurality of spaced apart skirts 76 which are separated by reduced diameter necks 78 of the insulator.

The worker standing on the ground uses the pole 54 to apply the animal guard 12 to one of the necks 78 of the insulator. The split 16 is first applied to the neck 78, and the split construction of the ring 14 allows the split 16 to open sufficiently to slip around the neck 78. When the animal guard 12 has been fully applied, the tension spring causes the split 16 to close in order to maintain the animal guard securely in place on the neck 78 of the insulator.

Once the animal guard has been installed, the pole can be pulled away from the insulator in order to release the tool 10 from the animal guard 12. The pulling force overcomes the frictional gripping force applied by the flap 38 pressing toward the plate 36, and the tool 10 can be easily slipped off of the base 22 of the animal guard.

In this manner, the animal guard 12 can be safely and easily applied to the insulator 72 so that it can prevent squirrels and other climbing animals from possibly damaging the electrical equipment by short circuiting the overhead power lines. The tool 10 securely grips the base of the animal guard so that it will not inadvertently slip out of place while it is being applied to the insulator. At the same time, the construction of the tool 10 allows it to be easily released from the animal guard after the installation has been completed.

It is particularly noteworthy that the worker who installs the animal guard can work entirely from ground level and can use the elongated extension hot stick pole 54 so that he remains at ground level 20 or 30 feet away from the electrical lines at a safe distance in the event that there is any type of accident that creates an electrical spark or even a fire. Accordingly, aside from allowing the animal guard to be easily installed, the tool 10 of the present invention provides safety in the installation procedure that is not provided when workers must work in closer proximity to the electrical lines and equipment.

From the foregoing it will be seen that this invention is one well adapted to attain all ends and objects hereinabove set forth together with the other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative, and not in a limiting sense.

Having thus described the invention, what is claimed is:

1. A tool for use with an elongated pole to install an animal guard having a base on an overhead electrical insulator, said base including a pair of arms projecting sidewardly in opposite directions, said tool comprising:

a tool body presenting a space for receiving and releaseably holding the base of the animal guard therein by spring action, said tool body including a plate presenting a contoured cavity in which said base is received, said cavity having portions for receiving said arms and said tool body further including a flap connected to said plate in a manner to provide said space between said plate and flap, said flap being urged toward said plate to frictionally grip the base; and an attachment mechanism allowing said tool body to be attached to the pole, whereby an operator at ground level can use the pole to apply the animal guard to the insulator and then release said tool body from the guard by pulling the tool body to separate the tool body from said base.

2. A tool as set forth in claim 1, wherein said attachment mechanism includes:

a fastener extending from said tool body; and a connection between said fastener and the pole allowing adjustment of the angular orientation of the tool body relative to the pole.

3. A tool for use with an elongated pole in the installation of an animal guard having a base on an overhead electrical insulator, said base including a pair of arms projecting sidewardly in opposite directions, said tool comprising:

a tool body having a plate and a flap connected with said plate in a manner to present a space for receiving the base of the animal guard, said flap and plate being urged together to frictionally grip the base to releaseably hold the base in said space, said plate presenting a contoured cavity in which said base is received, said cavity having portions for receiving said arms; and an attachment mechanism attaching said tool body to the elongated pole to allow a worker at ground level to apply the animal guard to the insulator using the pole, and to release the tool body from the animal guard by pulling the tool body to overcome the frictional gripping of the base by said plate and flap.

4. A tool as set forth in claim 3, wherein said attachment mechanism includes:

a fastener extending from said tool body; and a connection between said fastener and the pole allowing adjustment of the angular orientation of the tool body relative to the pole.

* * * * *